United States Patent
Zoller et al.

(10) Patent No.: US 10,710,233 B2
(45) Date of Patent: Jul. 14, 2020

(54) TOOL INSERT AND/OR TOOL HOLDER INSERT, TOOL INSERT SYSTEM AND/OR TOOL HOLDER INSERT SYSTEM AND TOOL STORAGE SYSTEM AND/OR TOOL HOLDER STORAGE SYSTEM

(71) Applicant: E. Zoller GmbH & Co. KG Einstell- und Messgeräte, Pleidelsheim (DE)

(72) Inventors: Alexander Zoller, Pleidelsheim (DE); Christian Pfau, Ingersheim (DE)

(73) Assignee: E. ZOLLER GMBH & CO. KG EINSTELL—UND MESSGERÄTE, Pleidelsheim (DE)

( * ) Notice: Subject to any disclaimer, the term of this patent is extended or adjusted under 35 U.S.C. 154(b) by 0 days.

(21) Appl. No.: 16/254,702

(22) Filed: Jan. 23, 2019

(65) Prior Publication Data

US 2019/0224839 A1    Jul. 25, 2019

(30) Foreign Application Priority Data

Jan. 25, 2018  (DE) .................... 20 2018 100 425 U

(51) Int. Cl.
*B25H 3/00*    (2006.01)
*B25H 3/06*    (2006.01)
(Continued)

(52) U.S. Cl.
CPC .............. *B25H 3/003* (2013.01); *B25H 3/04* (2013.01); *F16B 2/22* (2013.01)

(58) Field of Classification Search
CPC .. B25H 3/04; B25H 3/003; B25H 3/06; F16B 2/22
See application file for complete search history.

(56) References Cited

U.S. PATENT DOCUMENTS 3,684,101 A    8/1972  Bradford et al.
4,155,460 A    5/1979  Ratti
(Continued)

FOREIGN PATENT DOCUMENTS

DE    2619151 A1    11/1977
DE    7801757 U1    6/1978
(Continued)

OTHER PUBLICATIONS

Search Report dated Oct. 29, 2018 issued in corresponding DE patent application No. 20 2018 100 425.5 (and Partial English translation).

(Continued)

*Primary Examiner* — Kimberley S Wright
(74) *Attorney, Agent, or Firm* — Posz Law Group, PLC

(57) ABSTRACT

A tool insert and/or tool holder insert, in particular tool storage insert and/or tool holder storage insert, has at least one base body, includes at least one receiving region, in particular at least in part as an opening, in the base body, for receiving at least in part at least one tool and/or at least one tool holder, and has at least one contact element, which is arranged at least in part inside the receiving region, in particular projecting into the receiving region, for the purpose of contacting mounting of the tool and/or of the tool holder, and includes side walls, which complement one another and extend, in particular parallel to a receiving direction of the receiving region, on at least two opposite outside surfaces of the base body, which are configured to engage at least in part with side walls of further tool inserts and/or tool holder inserts.

22 Claims, 7 Drawing Sheets

Figure 1:
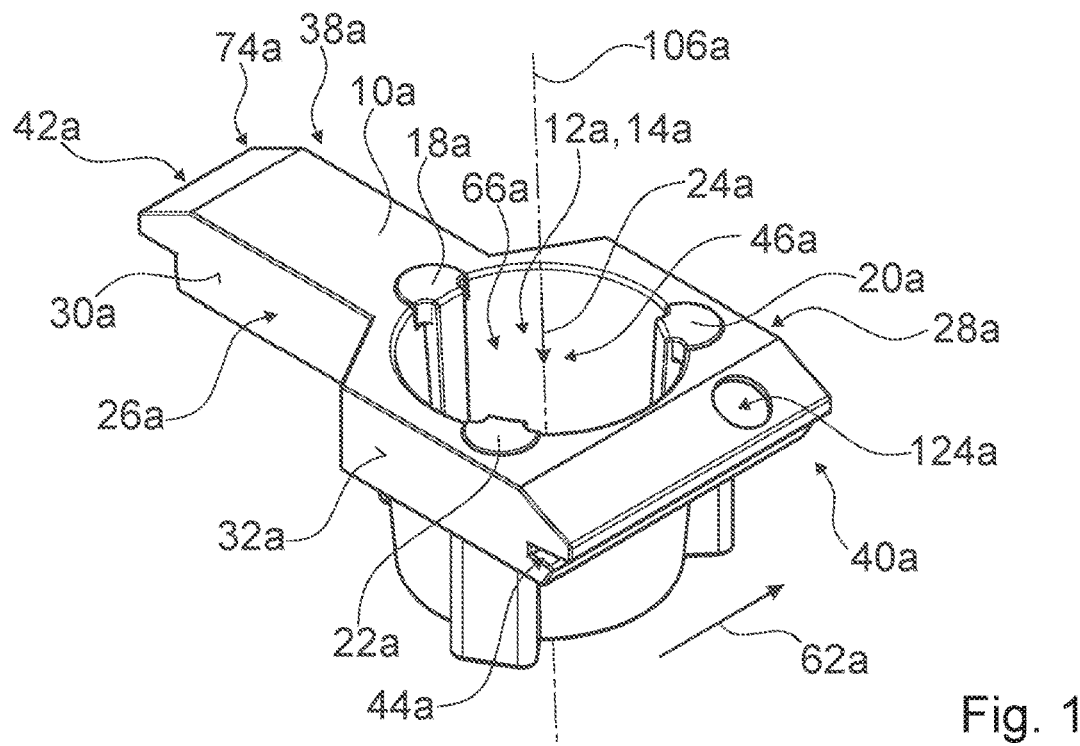

(51) Int. Cl.
*B25H 3/04* (2006.01)
*F16B 2/22* (2006.01)

(56) References Cited

U.S. PATENT DOCUMENTS

| | | |
|---|---|---|
| 4,410,095 A | 10/1983 | Dembicks |
| 4,535,897 A | 8/1985 | Remington et al. |
| 4,770,297 A | 9/1988 | Chang |
| 5,050,756 A | 9/1991 | Tielker et al. |
| 5,154,686 A | 10/1992 | Klarer et al. |
| 6,047,827 A | 4/2000 | Huang |
| 2005/0143238 A1 | 6/2005 | Sakuragi |

FOREIGN PATENT DOCUMENTS

| | | |
|---|---|---|
| DE | 3234773 A1 | 3/1984 |
| DE | 87 16 734 U1 | 2/1988 |
| DE | 29710341 U1 | 10/1998 |
| DE | 20 2013 105 024 U1 | 1/2014 |
| EP | 0104866 A1 | 4/1984 |
| EP | 0 152 374 A2 | 8/1985 |
| EP | 1 547 725 A1 | 6/2005 |
| WO | 00/66330 A1 | 11/2000 |

OTHER PUBLICATIONS

Partial Search Report dated Aug. 28, 2019 issued in corresponding EP patent application No. 19152426.3 (and English translation).
Extended Search Report dated Nov. 22, 2019 issued in corresponding EP patent application No. 19152426.3 (and English translation).

US 10,710,233 B2

TOOL INSERT AND/OR TOOL HOLDER INSERT, TOOL INSERT SYSTEM AND/OR TOOL HOLDER INSERT SYSTEM AND TOOL STORAGE SYSTEM AND/OR TOOL HOLDER STORAGE SYSTEM

CROSS REFERENCE TO RELATED APPLICATION

This application is based on and incorporates herein by reference German Patent Application No. 20 2018 100 425.5 filed on Jan. 25, 2018.

PRIOR ART

The invention relates to a tool insert and/or tool holder insert, to a system of tool inserts and/or tool holder inserts, to a tool insert system and/or tool holder insert system and to a tool storage system and/or tool holder storage system.

A tool insert and/or tool holder insert having at least one base body, comprising at least one receiving region for receiving at least in part at least one tool and/or at least one tool holder and having at least one contact element, which is arranged at least in part inside the receiving region, for realizing contacting mounting of the tool and/or of the tool holder, has already been proposed.

The object of the invention consists, in particular, in providing a generic device with advantageous storage characteristics for storing tools and/or tool holders.

Advantages of the Invention

The invention proceeds from a tool insert and/or tool holder insert, in particular tool storage insert and/or tool holder storage insert, having at least one base body, comprising at least one receiving region that is realized, in particular at least in part as an opening, in the base body, for receiving at least in part at least one tool and/or at least one tool holder, and having at least one contact element, which is arranged at least in part inside the receiving region, in particular projecting into the receiving region, for the purpose of realizing a contacting mounting of the tool and/or of the tool holder.

It is proposed that the tool insert and/or tool holder insert, in particular tool storage insert and/or tool holder storage insert, comprises side walls, which are realized so as to complement one another and extend, in particular parallel to a receiving direction of the receiving region, on at least two opposite outside surfaces of the base body, which are configured to engage at least in part with side walls of further tool inserts and/or tool holder inserts.

In particular, this makes it possible to create advantageous storage characteristics for storing tools, in particular up to a sensible cutting edge diameter and/or distance, and/or tool holders. For example, the tool insert and/or tool holder insert could be configured advantageously for storing tools with a cutting edge diameter of at least up to 70 mm. In an advantageous manner, a high packing density can be achieved when storing tools and/or tool holders, in particular by being able to utilize an available storage surface as effectively as possible as a result of arranging tool inserts and/or tool holder inserts suitably with respect to one another, in particular where tools and storage bases are arranged linearly, for example mounting frames. In an advantageous manner, in this case, a number of tool inserts and/or tool holder inserts can be optimized and/or maximized per available storage area, as a result of which, in particular, a necessary storage area and storage costs connected thereto are able to be reduced.

A "tool holder" is to be understood, in particular, as a component which is configured for receiving a tool and for connecting the tool to the machine. In particular, the tool holder is realized as an interface between tool and machine. The tool holder is preferably realized as a tool chuck. A "tool insert" or a "tool holder insert" is to be understood, in particular, as a device which is configured for the purpose of mounting at least one tool or one tool holder in a non-displaceable and/or positionally fixed manner. In particular support surfaces, which can be adapted, in particular at least in part to an outer shape of an object to be mounted, internal pressing forces, for example as a result of deforming a portion of the tool insert and/or of the tool holder insert plastically by means of the stored object and/or friction forces between at least one surface of the tool insert and/or of the tool holder insert and at least one surface of the stored object, serve, in particular, for mounting the tool and/or the tool holder. The mounting is effected, in particular, free of external fastening measures such as, for example, binding, suctioning, bonding, external pressing or the like. For storing, the tool or the tool holder is, in particular, placed or positioned in the receiving region of the tool insert or of the tool holder insert and for removal, the tool or the tool holder is removed from the receiving region of the tool insert or of the tool holder insert by means of simple lifting.

An "opening in the base body" is to be understood, in particular, as a recess in the base body which realizes a space for at least a portion of a body of the tool and/or of the tool holder to be received. A "contact element" is to be understood, in particular, as part of the tool insert or of the tool holder insert which contacts the tool or the tool holder during the storage. The tool insert and/or tool holder insert preferably comprises a plurality of contact elements which are arranged, in particular, symmetrically to one another. The contact elements can be realized in one piece with the base body and/or can be separable from the base body. "In one piece" is to be understood, in particular, as connected in a substance-to-substance bond, such as, for example as a result of a weld process and/or bonding process etc., and in a particularly advantageous manner molded-on, as when produced from a casting and/or as a result of production using single-component or multi-component injection molding. The contact element being arranged "at least in part inside the receiving region" is to be understood, in particular, as at least 15%, preferably at least 35%, in an advantageous manner at least 60%, in a preferred manner at least 85% and in an especially preferred manner 100% of the contact element being arranged inside a space in the base body defined by the receiving region. "Provided" is to be understood, in particular, as especially programmed, designed and/or equipped. An object being configured for a certain function is to be understood, in particular, as the object fulfilling and/or carrying out said certain function in at least one application and/or operation state.

Two side walls being "realized so as to complement one another" is to be understood, in particular, as the side walls, in particular surfaces of the side walls, comprising shapes, in particular outer shapes, which are realized and/or formed contrary to one another, the shapes, in particular outer shapes, of the side walls, in particular the surfaces of the side walls, complement one another, in particular when "moving into contact". Two side walls, which complement one another, engage in one another, in particular, in a jigsaw-piece-like manner on contact. The "receiving direction" is realized, in particular, as a direction which extends parallel to a main direction of movement of a tool and/or of a tool holder when it is stored in the tool insert and/or the tool holder insert. In particular, in a stored state, the receiving direction is aligned at least substantially parallel to the vertical. "Substantially parallel" is to be understood here, in particular, as an alignment of a direction relative to a reference direction, in particular in one plane, the direction comprising a deviation in relation to the reference direction in particular smaller than 8°, advantageously smaller than 5° and especially advantageously smaller than 2°. A "side wall" of the tool insert and/or tool holder insert is to be understood, in particular, as a lateral delimitation of the base body of the tool insert and/or tool holder insert which is arranged at least predominantly laterally of the receiving region. The side wall is preferably at least substantially parallel to the receiving direction and/or in the stored state to the vertical. A "stored state" is to be understood, in particular, as a state of the tool insert and/or tool holder insert which is configured for the purpose of mounting tools securely, in particular, protected from tipping and/or shifting.

"To engage" is to mean, in particular, a contacting of two parts and/or surfaces, wherein one part and/or one surface fits into the other part and/or the other surface. In particular, in an engagement of two objects and/or surfaces, and in particular of the side walls of two tool inserts and/or of two tool holder inserts, the smallest possible imaginary geometric rectangular cuboids that just still completely encompass the respective object and/or the respective surface, in particular the respective tool insert and/or tool holder insert having one of the side walls, overlap at least partly.

It is additionally proposed that side faces, in particular contact faces, of a side wall of the side walls, which are realized so as to complement one another, extend in at least two planes which are substantially different from one another. As a result, in particular, advantageous geometry of the tool insert and/or tool holder insert can be achieved, with which, in particular, a possible packing density can be further increased. "Substantially different from one another" is to be understood, in particular, as extending in an angled manner with respect to one another at least at an angle greater than 5°, preferably greater than 10° and in a preferred manner greater than 30° or extending parallel to one another at a spacing apart from one another of at least 3 mm, preferably at least 5 mm, in a preferred manner at least 1 cm and in an especially preferred manner at least 2 cm.

It is additionally proposed that at least two of the planes defined by the side faces, in particular contact faces, of a side wall of the side walls, which are realized so as to complement one another, extend at least substantially parallel to one another. As a result, in particular, advantageous geometry of the tool insert and/or tool holder insert can be achieved, with which, in particular, a possible packing density is able to be further increased.

It is also proposed that, in a top view, the base body realizes at least substantially a shovel shape, a spatula shape and/or a shape of a letter Y which is closed at the top. As a result, in particular, advantageous geometry of the tool insert and/or tool holder insert can be achieved, with which, in particular, a possible packing density can be further increased. A "shovel shape" is to be understood, in particular, as an outer shape which consists at least substantially of a first rectangle and a second rectangle. The first rectangle comprises, in this connection, in particular, at least substantially identically long side faces. The second rectangle is realized, in particular, as an elongated rectangle. The second rectangle, in particular in the case of the shovel shape, is arranged with a short side at least substantially in the middle of one side of the first rectangle. A "spatula shape" is to be understood, in particular, as an outer shape which consists at least substantially of an at least substantially isosceles trapezium and an elongated rectangle. The elongated rectangle is arranged, in particular, in the case of the spatula shape with a short side at least substantially in the middle of a shorter base side of the trapezium. A "shape of a letter Y which is closed at the top" is to be understood, in particular, as an outer shape which consists at least substantially of a hexagon, an elongated rectangle. The hexagon comprises, in this connection, a shape which corresponds to a rectangle from which two adjacent corners have been cut off uniformly and to the same size. The elongated rectangle, in particular, in the case of the shape of a letter Y which is closed at the top, is arranged in the middle of the side of the hexagon which lies between the "cut-off corners". The short side of the elongated rectangle preferably corresponds, in this connection, at least substantially to the length of the side of the hexagon between the "cut-off corners".

It is further proposed that the base body comprises at least one mounting element on at least one further side wall, preferably on at least two further opposite side walls, for mounting on an external structural unit, in particular on a mounting rail of an external structural unit which extends parallel to the further side wall. As a result, an alignment and/or mounting of the tool insert and/or tool holder insert is able to be advantageously simplified. The mounting element can be realized in an advantageous manner so as to be universally usable, for example by being realized so as to be compatible with pre-existing systems of mounting frames. In particular, the mounting element could be realized so as to be compatible with a mounting frame which comprises a rake-shaped grid on at least one frame side, such as, for example, a customary insert frame for use in drawers. As a result, a combination of two systems and/or a change from one system to another system could be simplified. The external structural unit can be realized, in particular, as at least a portion of a mounting frame, of a drawer and/or of a storage compartment. The further side wall is preferably arranged at least substantially perpendicularly to the side wall. The expression "substantially perpendicularly" here, in particular, is to define an alignment of a direction relative to a reference direction, the direction and the reference direction, in particular when viewed in one plane, enclosing an angle of 90° and the angle comprising a maximum deviation of, in particular, less than 8°, in an advantageous manner less than 5° and in an especially advantageous manner less than 2°.

It is additionally proposed that the contact element has an outer shape which comprises an at least substantially continuously increasing and/or continuously decreasing contour at least in a direction that is perpendicular to a receiving direction of the receiving region. As a result, in particular, advantageous holding characteristics of the tool insert and/or tool holder insert can be achieved, in particular by a surface of the contact element which contacts a tool and/or a tool holder being able to be optimized. "Continuously increasing and/or continuously decreasing" is to be understood, in particular, as free of part portions with a constant outer shape and/or free of part portions with abrupt kinks, in particular, at an angle of 60° or more.

It is further proposed that, with the tool insert and/or the tool holder in a receive-ready state, the contact element extends into an interior of the receiving region. As a result, in particular, advantageous holding characteristics of the tool insert and/or tool holder insert can be achieved, in particular by an overall contact face and consequently, for example, also friction with a surface of the tool and/or of the tool holder being able to be kept small when storing and removing. The interior of the receiving region is, in particular, completely surrounded by and/or includes the base body of the tool insert and/or of the tool holder insert at least for the most part, preferably at least in a spatial plane. In particular, the interior of the receiving region comprises at least one center which, in particular when viewed in top view of the tool insert and/or tool holder insert, is realized, in particular, as the midpoint and/or as the center of gravity of the receiving region.

It is further proposed that at least a portion of the at least one contact element at least partly has an at least substantially wedge-shaped, in particular truncated wedge-shaped, outer shape. As a result, in particular advantageous holding characteristics of the tool insert and/or tool holder insert can be achieved, in particular by a surface of the contact element which contacts a tool and/or tool holder being able to be optimized. In particular, at least a portion of the contact element comprises an at least substantially wedge-shaped, in particular truncated wedge-shaped, outer shape which extends into the receiving region.

When the at least one contact element comprises a wedge angle, which is spanned between two side surfaces of the contact element, of at least 15°, preferably of at least 20°, in a preferred manner of at least 25°, and in an especially preferred manner of no more than 30°, holding characteristics of the contact element are able to be further optimized.

It is also proposed that the contact element, with the tool insert and/or the tool holder insert in a receive-ready state, extends in a wedge-shaped manner toward an interior of the receiving region. As a result, in particular advantageous holding characteristics, for example a high level of stability, in particular holding stability of a tool and/or a tool holder in the tool insert and/or tool holder insert, are able to be achieved.

It is additionally proposed that a contact surface of the contact element, which is configured for contacting at least a portion of a tool inserted in the receiving region and/or of a tool holder inserted in the receiving region, has in at least a partial region of the contact element at least one tangential plane comprising at least one partial component which, with the tool insert and/or the tool holder insert in a mounting position, extends parallel to the horizontal. As a result, in particular advantageous holding characteristics of the tool insert and/or tool holder insert are able to be achieved. In particular, the tool insert and/or tool holder insert realizes at least one store-ready state in the mounting position.

It is further proposed that a contact surface of the contact element, which is configured for contacting at least a portion of a tool inserted in the receiving region and/or of a tool holder inserted in the receiving region, is arranged in an angled manner relative to an extrusion, which is vertical in particular in a mounting position of the tool insert and/or of the tool holder insert, of a receiving opening of the receiving region, which delimits the receiving region, in a receiving direction of the receiving region, and/or relative to a prolongation of the receiving region, in particular to a delimitation of the receiving region, in the receiving direction. As a result, in particular advantageous holding characteristics of the tool insert and/or tool holder insert are able to be achieved. The extrusion is to be understood, in particular, as an imaginary continuation of the contour of the receiving opening of the receiving region which extends in a vertical direction in the mounting position. The prolongation of the receiving region is to be understood, in particular, as an imaginary continuation of the receiving region in the vertical direction which, in particular in a mounting state, includes an angle with the vertical which is equivalent to a mean angle relative to the vertical of the receiving region, in particular of the delimitation of the receiving region formed by the base body, and/or to an angle of the receiving region relative to the vertical on a lower end of the receiving region in the vertical direction.

When an angle, which is enclosed by the contact surface and the extrusion of the receiving opening, is at least 1°, preferably at least 3°, in an advantageous manner at least 5°, in a preferred manner at least 7° and in an especially preferred manner at least 10°, a high holding force and/or holding stability of a stored tool and/or a stored tool holder can be advantageously achieved, in particular independently of the tare weight of the tool and/or the tool holder. The angle can preferably be realized so as to be adapted to the tare weight. As a result, a holding force is advantageously generated by an interaction with a gravitational force. A heavier tare weight brings about, in particular, a larger angle relative to the vertical in the case of such an adaptation.

When, in addition, a further angle enclosed by the contact surface and the prolongation of the receiving region, in particular the delimitation of the receiving region, is at least 1°, preferably at least 3°, in an advantageous manner at least 5°, in a preferred manner at least 7° and in an especially preferred manner at least 10°, a holding force and/or holding stability of the stored tool and/or of a stored tool holder can be further optimized in an advantageous manner. In addition, a high level of stability of the tool insert and/or of the tool holder insert can be achieved.

If, additionally, the angle, which is enclosed by the contact surface and the extrusion of the receiving opening and/or the further angle which is enclosed by the contact surface and the prolongation of the receiving region, in particular, by the delimitation of the receiving region, is no more than 3°, preferably no more than 5°, in an advantageous manner no more than 7°, in a preferred manner no more than 15° and in an especially preferred manner no more than 25°, a good holding force and/or holding stability of the stored tool and/or of a stored tool holder can be achieved in an advantageous manner.

It is additionally proposed that the angle and the further angle differ in size. As a result, advantageous characteristics with regard to stability can be achieved. The angle and the further angle "differing in size" is to be understood, in particular, as the angle and the further angle, at least in a store-ready state, spanning an angle which differs to the vertical by at least 1°, preferably by at least 2°, in a preferred manner by at least 3° and in an especially preferred manner by at least 5°.

It is further proposed that the contact surface is realized at least in part in a curved manner. As a result, in particular advantageous storage characteristics for storing tools and/or tool holders are able to be created, for example an overall contact surface can be further optimized in an advantageous manner.

When the contact surface is curved at least substantially in a direction that is perpendicular to a receiving direction of the receiving region, an overall contact surface and/or holding force can be advantageously optimized in dependence on an insertion depth of a stored tool and/or a stored tool holder. The phrase "curved in a direction" is to be understood, in particular, as an object and/or a surface, when viewed along the direction, describing an arc and/or as the object and/or the surface, when viewed perpendicular to the direction, comprising a radius of curvature.

When the contact surface is curved at least substantially in a direction that is parallel to a receiving direction of the receiving region, an overall contact surface when mounting a tool and/or a tool holder can be further reduced in an advantageous manner.

It is additionally proposed that the at least one contact element is realized separately from the base body. As a result, flexibility can be increased in an advantageous manner, for example by a plurality of different contact elements being able to be combinable with the same base body.

When, in addition, the at least one contact element is realized so as to be exchangeable, flexibility can be further increased as a result, for example, depending on the type of object to be stored, by suitable contact elements being able to be combined with the base body before the storing. In addition, individual faulty and/or worn contact elements are able to be exchanged advantageously in a simple manner, as a result of which, in particular, costs and expenditure for repair work are able to be reduced. The contact elements can be insertable into the base body and/or removable from the base body, for example by means of rails. A clip connection can be configured, for example, for fastening the contact elements on the base body.

It is further proposed that at least one contact element is at least partly flexibly deformable and/or comprises at least one contact surface which is at least partly flexibly deformable. As a result, a holding force and/or holding stability can be further optimized in an advantageous manner. The flexibly deformable contact element could be realized, for example, at least in part as a bending spring and/or as a torsion spring. As an alternative to this, the flexibly deformable contact element and/or the flexibly deformable contact surface could be realized at least in part from a resiliently compressible material, for example an elastomer.

It is additionally proposed that the tool insert and/or the tool holder insert comprises at least a plurality of contact elements, preferably at least three, advantageously at least four and in a preferred manner at least five contact elements. As a result, a holding force and/or stability can be optimized further in an advantageous manner. The contact elements are preferably arranged at least in part in a regular manner on an edge of the receiving opening.

It is additionally proposed that a center of the receiving opening and/or of the receiving region, in particular a point of intersection between at least two normal vectors of contact faces of two contact elements, in particular when viewed in a top view, is arranged laterally offset in the base body. As a result, advantageous storage characteristics can be created for storing tools and/or tool holders. A high packing density can be achieved in an advantageous manner when storing tools and/or tool holders, in particular by an available storage surface being able to be utilized as effectively as possible as a result of tool inserts and/or tool holder inserts being arranged in a suitable manner with respect to one another. In an advantageous manner, in this case, a number of tool inserts and/or tool holder inserts can be optimized and/or maximized per available storage area. "Laterally offset in the base body" is to be understood, in particular when viewed in top view, as being at irregular distances to at least two opposite lateral limitations, in particular the further side walls, of the base body. In particular, a center of the receiving opening and/or of the receiving region does not overlap with a center of gravity of the base body.

In addition, a system of tool inserts and/or tool holder inserts, having at least two tool inserts and/or tool holder inserts is proposed, the tool inserts and/or tool holder inserts of which are arranged in such a manner with respect to one another that side walls of the at least two tool inserts and/or tool holder inserts at least partly engage in one another. As a result, advantageous storage characteristics for storing tools and/or tool holders can be created. A high packing density can be achieved in an advantageous manner when storing tools and/or tool holders, in particular by an available storage surface being able to be utilized as effectively as possible as a result of tool inserts and/or tool holder inserts being arranged in a suitable manner with respect to one another. In particular, an arbitrary number of tool inserts and/or tool holder inserts are arrangeable in a row by at least two inserts and/or tool holder inserts engaging in one another and/or at least in part by three tool inserts and/or tool holder inserts engaging in one another. Each tool insert and/or tool holder insert is preferably configured to engage with a further tool insert and/or tool holder insert on each of two opposite sides, adjacent tool inserts and/or tool holder inserts being arranged in each case in a plane, in particular, the horizontal plane, rotated about 180°. The receiving openings in a row of arranged tool inserts and/or tool holder inserts lie in particular on two parallel straight lines, in particular without overlap.

In addition, a tool insert system and/or tool holder insert system having at least one tool insert and/or tool holder insert and having at least one further contact element, in particular a further set of exchangeable contact elements which is realized differently to the contact element, is proposed. As a result, flexibility is able to be increased in an advantageous manner, in particular by different tools and/or tool holders, in particular tools and/or tool holders with different diameters, in particular shank diameters, are storable in the tool insert system and/or the tool holder insert system. In particular, the further contact element comprises an outer shape which differs from the contact element, for example a different contact surface, a different angle, preferably wedge angle, and/or a different extension in at least one spatial plane. For example, tool holders with sizes SK30, SK40, SK50 and/or HSK-A63 could be storable in the tool insert system and/or tool holder insert system, contact elements which are longer than those used for storing larger tool holders, i.e. extend further into an interior of the receiving region, being used in particular for storing smaller tool holders. In particular when the smaller tool holders hold tools, the cutting edge diameter of which is large, for example larger than 70 mm, an advantageous packing density, in particular by excluding mutual contact between two tools and/or tool holders, can be made possible in an advantageous manner with a tool insert system and/or tool holder insert system with suitable contact elements and an enlarged receiving region.

It is additionally proposed that at least one further contact element, in particular at least the contact elements of at least the further set of contact elements, with the tool insert and/or the tool holder insert in a mounting position, has a maximum horizontal transverse extension which is by at least 50% greater than, preferably at least twice the size of, in a preferred manner at least three times the size of and in an especially preferred manner at least four times the size of the maximum horizontal transverse extension of the at least one contact element. As a result, flexibility can be increased in an advantageous manner, in particular, by different tools and/or tool holders, in particular tools and/or tool holders with different diameters, in particular shank diameters, being storable in the tool insert system and/or tool holder insert system. A "maximum horizontal transverse extension" of an object is to be understood, in particular, as a largest side length of a smallest geometrical rectangular cuboid which just still completely encompasses the object and which comprises at least one side edge which extends parallel to a horizontal.

It is additionally proposed that at least a portion of a further contact element, in particular at least a portion of one of the contact elements of the at least one further set of contact elements, with the tool insert and/or tool holder insert in a mounting position, has a maximum horizontal transverse extension which projects into the receiving region and which is equivalent to at least 10%, preferably to at least 15%, advantageously to at least 20%, in a preferred manner to at least 25% and in an especially preferred manner to at least 30% of a maximum horizontal transverse extension of the receiving region. As a result, flexibility can be increased further in an advantageous manner, in particular by tools and/or tool holders with reduced diameters, in particular shank diameters, being able to be held securely in the tool insert system and/or tool holder insert system.

Additionally proposed is a tool storage system and/or tool holder storage system, having at least one tool insert and/or tool holder insert, having a system of tool inserts and/or tool holder inserts and/or having a tool insert system and/or tool holder insert system and having a tool storage unit which comprises at least one mounting rail for mounting at least one tool insert and/or at least one tool holder insert. As a result, in particular an advantageous storage device for tools and/or tool trays can be created which, in particular, allows storage with a high packing density. In particular, the tool storage unit is realized as a tool cabinet, a tool trolley and/or a compartment of a tool setting instrument and/or tool measuring instrument and/or as at least a portion of a tool cabinet, a tool trolley and/or a compartment of a tool setting instrument and/or tool measuring instrument. The mounting rail is preferably mounted so as to be movable relative to a base unit of the tool storage unit.

It is additionally proposed that the tool inserts and/or tool holder inserts are positioned in the mounting rail such that receiving openings of the receiving regions of the tool inserts and/or tool holder inserts are arranged in two at least substantially parallel rows which are laterally offset with respect to one another. As a result, it is possible to create in an advantageous manner a tool storage system and/or tool holder storage system which comprises a particularly advantageous packing density for stored tools and/or tool holders, as a result of which, in particular, advantageous space-saving is able to be obtained. In particular, the rows, which are offset laterally to one another, are arranged in a common plane, which is parallel to a horizontal plane, in the mounting position.

The tool insert and/or tool holder insert according to the invention, the system of tool inserts and/or tool holder inserts according to the invention, the tool insert system and/or tool holder insert system according to the invention and the tool storage system and/or tool holder storage system according to the invention is/are not to be restricted in this connection to the above-described applications and embodiments. In particular, the tool insert and/or tool holder insert according to the invention, the system of tool inserts and/or tool holder inserts according to the invention, the tool insert system and/or tool holder insert system according to the invention and the tool storage system and/or tool holder storage system according to the invention can comprise a number of individual elements, components and units which deviates from a number named herein for fulfilling a functionality described herein.

DRAWINGS

Further advantages are produced from the following description of the drawing. Three exemplary embodiments of the invention are shown in the drawings. The drawings, the description and the claims include numerous features in combination. In an expedient manner, the person skilled in the art will also look at the features individually and combine them to form sensible further combinations.

Figure 2:
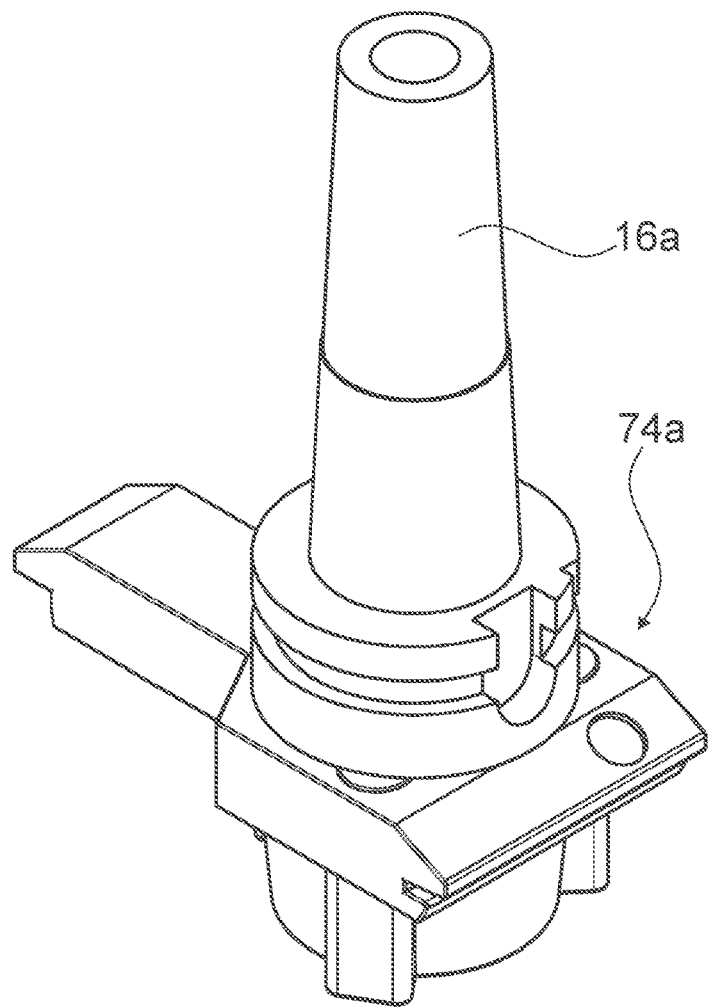
Figure 3:
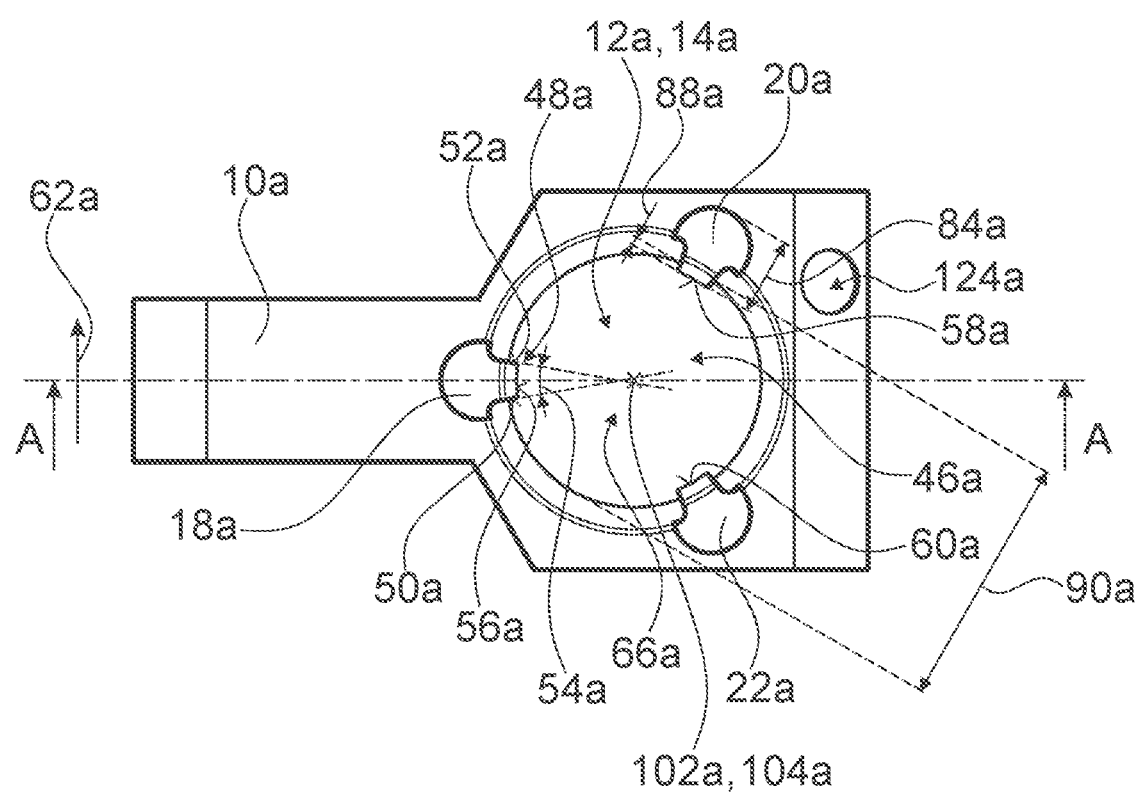
Figure 4:
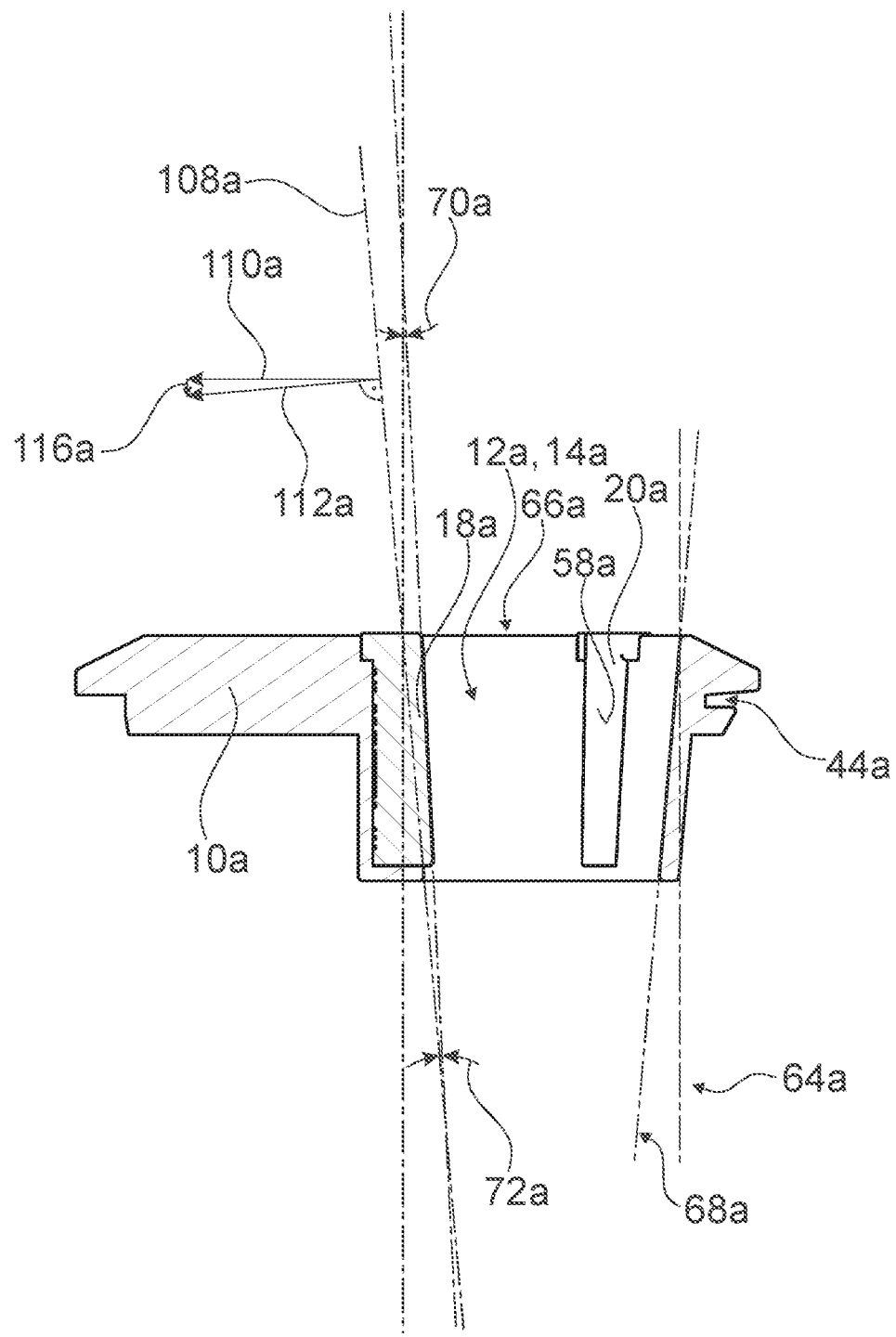
Figures 5A, 5B, 5C:
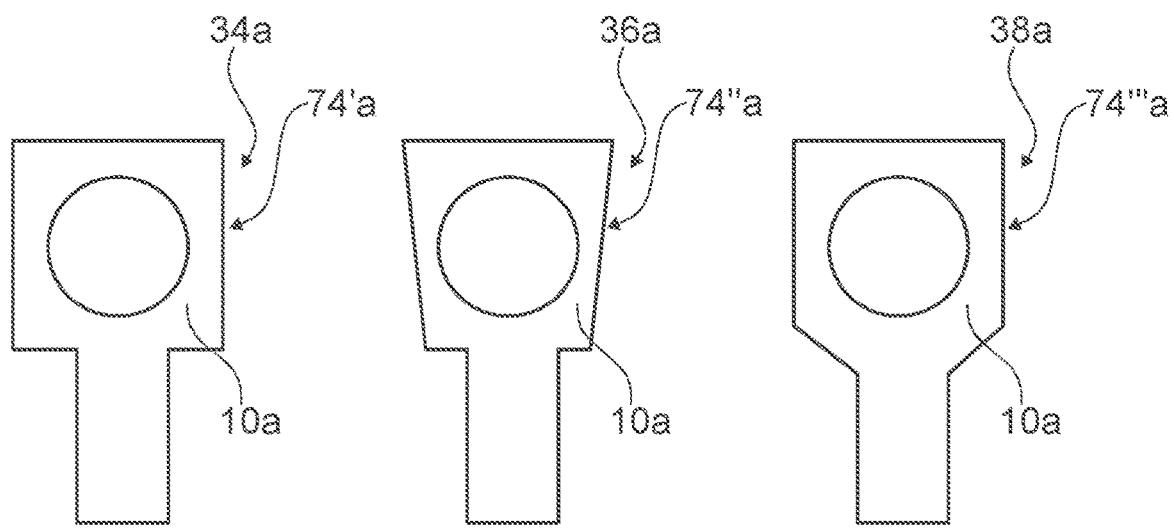
Figure 6:
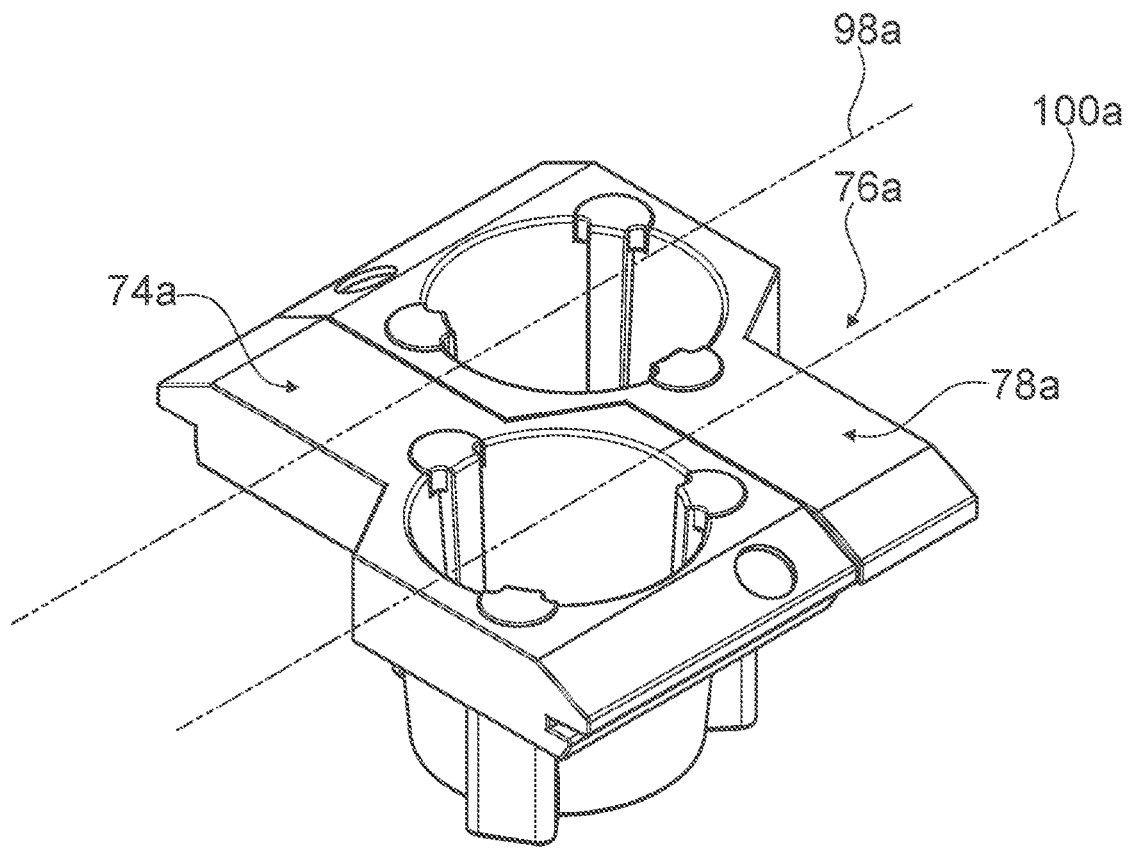
Figure 7:
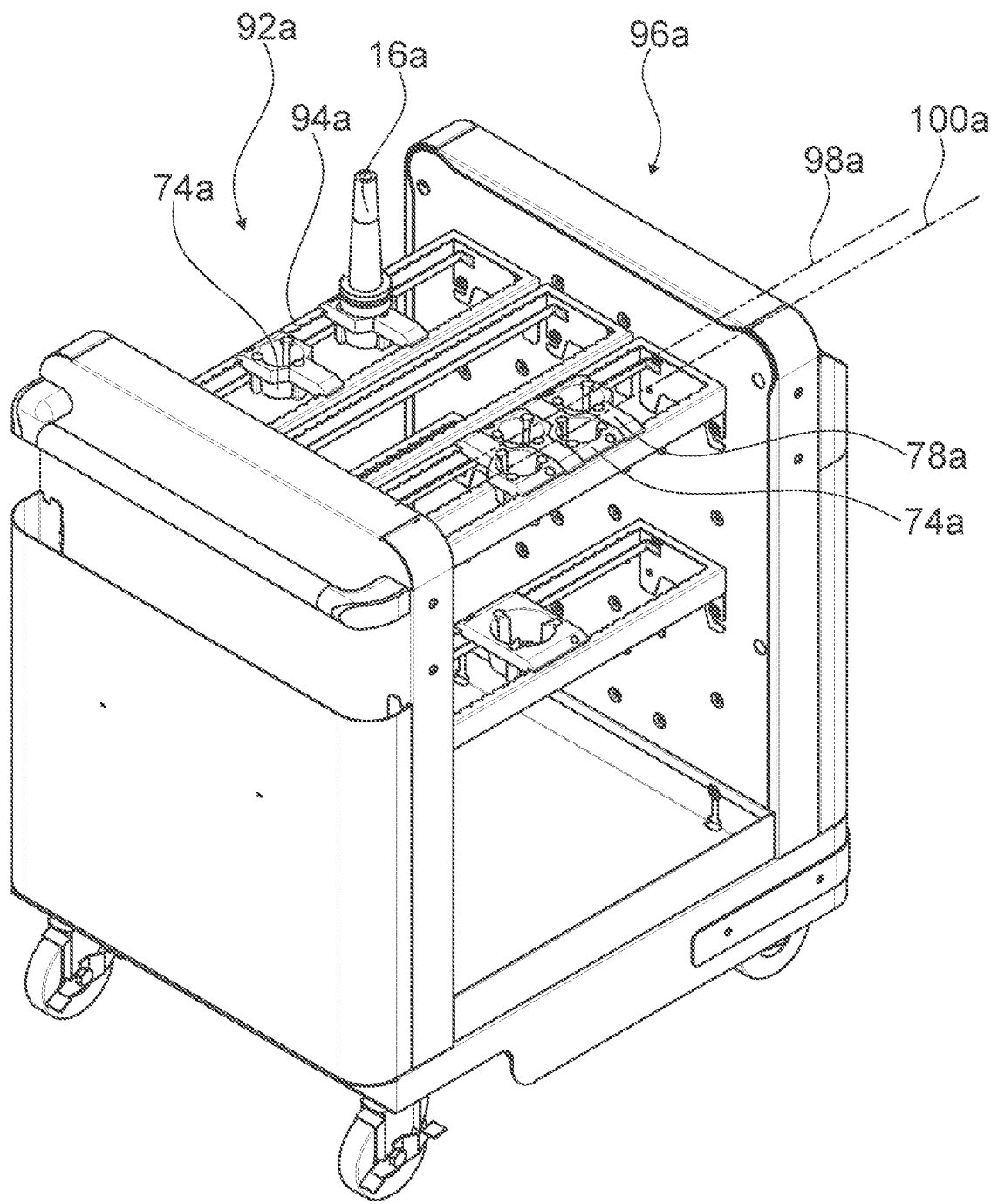
Figure 8:
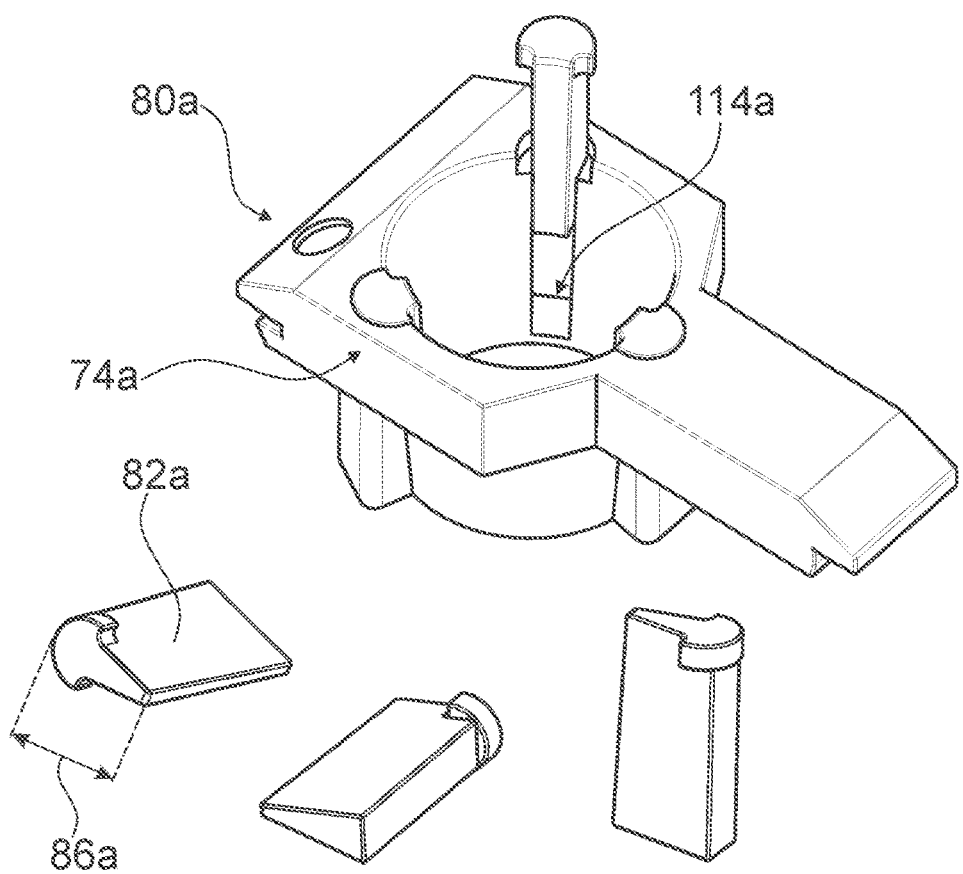
Figure 9:
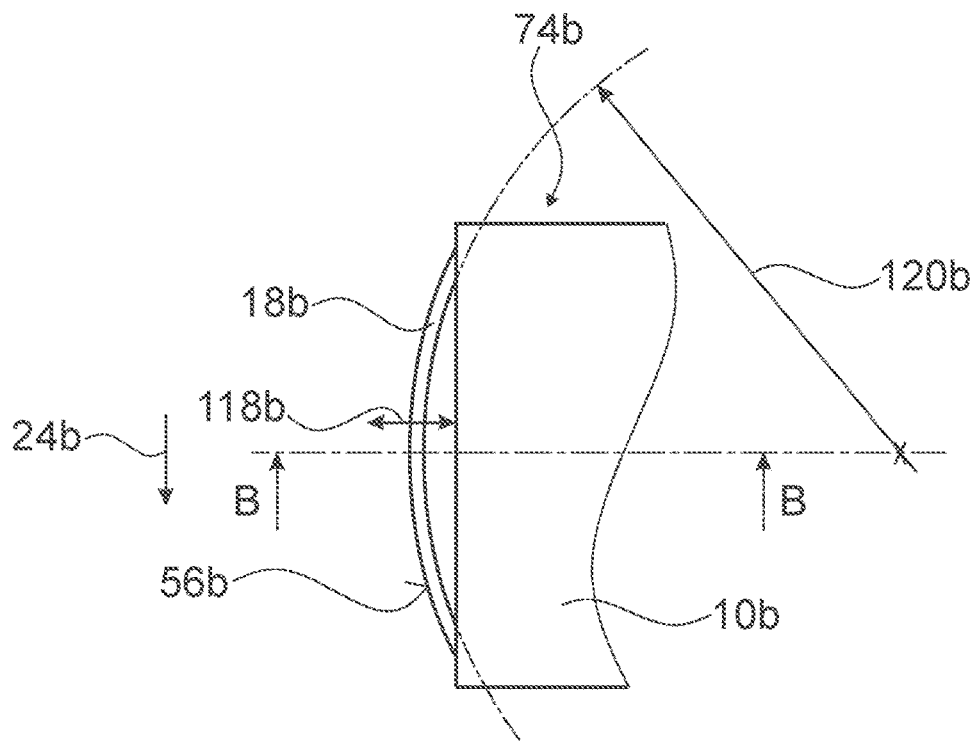
Figure 10:
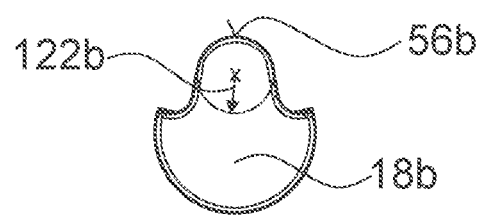
Figure 11:
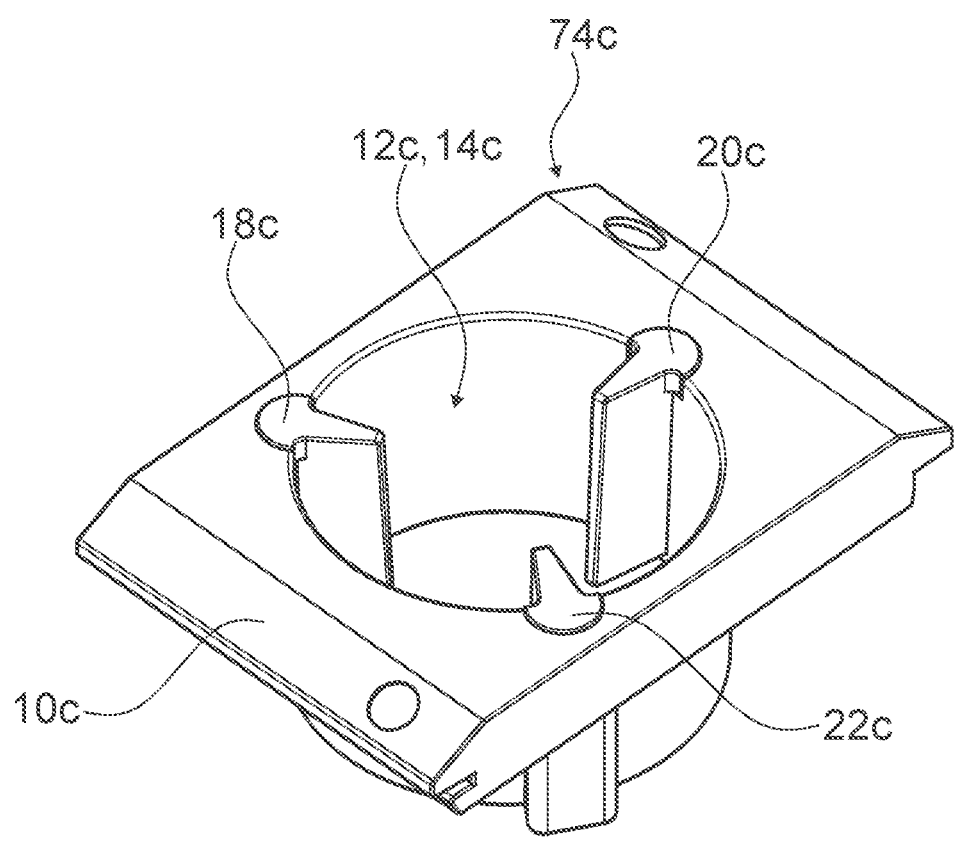

The drawings are as follows:

FIG. 1 shows a schematic, perspective view of a tool insert and/or tool holder insert, FIG. 2 shows the tool insert and/or tool holder insert with a tool holder stored therein, FIG. 3 shows a schematic top view of the tool insert and/or tool holder insert, FIG. 4 shows a schematic sectional view of the tool insert and/or tool holder insert, FIGS. 5*a*, 5*b*, and 5*c* show schematic top views of different tool inserts and/or tool holder inserts, FIG. 6 shows a schematic, perspective view of a system of tool inserts and/or tool holder inserts, FIG. 7 shows a schematic, perspective view of a tool storage system and/or tool holder storage system with tool inserts and/or tool holder inserts, FIG. 8 shows a tool insert system and/or tool holder insert system with the tool insert and/or tool holder insert and different contact elements, FIG. 9 shows a detail of a schematic sectional view of a tool insert and/or tool holder insert with an alternative contact element, FIG. 10 shows a cross section through the alternative contact element and FIG. 11 shows a schematic, perspective view of an alternative tool insert and/or tool holder insert.

DESCRIPTION OF THE EXEMPLARY EMBODIMENTS

FIG. 1 shows a tool insert and/or tool holder insert 74*a*. The tool insert and/or tool holder insert 74*a* is realized as a tool storage insert and/or tool holder storage insert. The tool insert and/or tool holder insert 74*a* comprises a base body 10*a*. The base body 10*a* comprises, in top view, a shape of a letter Y 38*a* which is closed at the top (cf. also FIG. 5*c*). The base body 10*a* comprises a receiving region 14*a*. The receiving region 14*a* is realized as an opening 12*a* in the base body 10*a*. The opening 12*a* is realized continuously by the base body 10*a*. As an alternative to this, the receiving region 14*a* and/or the opening 12*a* can also be realized in such a way that they are closed at the bottom. The receiving region 14*a* is configured for receiving at least in part at least one tool and/or at least one tool holder 16*a* (cf. FIG. 2). When a tool and/or a tool holder 16*a* is received, the tool and/or the tool holder 16*a* is moved from above in a receiving direction 24*a* into the receiving region 14*a*.

The receiving region 14*a* is arranged in a wide portion of the shape of the letter Y 38*a* which is closed at the top. The receiving region 14*a* is arranged in a forked portion of the letter Y of the shape of the letter Y 38*a* which is closed at the top. The receiving region 14*a* comprises an interior 46*a*. The interior 46*a* of the receiving region 14*a* is to be understood as a free volume which is formed by the opening 12*a*. The receiving region 14*a* comprises a center 102*a* (cf. FIG. 3). The center 102*a* of the receiving region 14*a* is arranged in the middle of the receiving region 14*a*. The receiving region 14*a* comprises a receiving opening 66*a*. The receiving opening 66a is realized in a circular manner. The receiving opening 66a delimits the receiving region 14a in the receiving direction 24a. The receiving opening 66a comprises a center 104a (cf. FIG. 3). The center 102a of the receiving region 14a and the center 104a of the receiving opening 66a are both arranged on a central axis 106a. The center 102a of the receiving region 14a is arranged offset laterally in the base body 10a. The center 104a of the receiving opening 66a is arranged offset laterally in the base body 10a. The receiving opening 66a comprises a transverse extension 90a (cf. FIG. 3). The transverse extension 90a of the receiving opening 66a extends parallel to a horizontal 62a. The transverse extension 90a of the receiving opening 66a corresponds to a diameter of the circular receiving opening 66a.

The base body 10a comprises a mounting element 44a. The mounting element 44a is arranged on a further side wall 40a, 42a of the base body 10a. The mounting element 44a is configured for mounting the base body 10a on an external structural unit. The mounting element 44a is realized as a mounting rail. As an alternative to this, the mounting element 44a can also be realized as a hole, for example a screw or rivet hole, as a latching element and/or as another element which is realized in a suitable manner for mounting on an external structural unit. The base body 10a is mountable in a screw-free manner on an external structural unit, for example a mounting frame. The base body 10a comprises a latching element (not shown). The latching element is configured for mounting the base body 10a on the external structural unit, for example the mounting frame. The latching element is arranged on a further side wall 42a which is opposite the mounting element 44a. The latching element is configured for the purpose of forming a positive locking closure with a corresponding latching element of the mounting frame. As an alternative to this or in addition to it, an undercut, which engages in at least a portion of the structural unit and/or at least engages under the mounting frame, can be configured for fastening the base body 10a on the external structural unit, in particular, the mounting frame. As an alternative to this or in addition to it, a fastening of the base body 10a to the external structural unit, in particular the mounting frame, can be provided by means of a screw. The base body 10a is beveled on the sides of the further side walls 40a, 42a relative to the horizontal 62a. The beveling is configured for the attachment of a label. In addition, the base body 10a comprises a domed or deepening 124a in the beveled region. The domed or deepening 124a is configured for attaching, in particular in a slip-free manner, a label, for example a sticker.

The tool insert and/or tool holder insert 74a comprises side walls 26a, 28a. The side walls 26a, 28a are realized so as to complement one another. The side walls 26a, 28a extend parallel to a receiving direction 24a of the receiving region 14a. The side walls 26a, 28a are arranged on two opposite outside surfaces of the base body 10a. The side walls 26a, 28a, which complement one another, are configured to partially engage with side walls of further tool inserts and/or tool holder inserts. In a top view, the side walls 26a, 28a comprise a stepped shape, in particular a shape that is stepped in a beveled manner.

The side wall 26a comprises side faces 30a, 32a. The side faces 30a, 32a realize contact faces to a further side wall. The side faces 30a, 32a of a side wall 26a of the side walls 26a, 28a which complement one another extend on at least two planes which are substantially different from one another. Two of the planes defined by the side faces 30a, 32a of the side wall 26a of the side walls 26a, 28a which are realized so as to complement one another extend parallel to one another. The side faces 30a, 32a are realized in a planar manner. The side faces 30a, 32a extend perpendicularly to a horizontal surface of the base body 10a. The side faces 30a, 32a are connected to one another by means of a further side wall which realizes a further side face.

The tool insert and/or tool holder insert 74a comprises a plurality of contact elements 18a, 20a, 22a. The tool insert and/or tool holder insert 74a comprises three contact elements 18a, 20a, 22a. The contact elements 18a, 20a, 22a are configured for realizing a contacting mounting of the tool and/or of the tool holder 16a. The contact elements 18a, 20a, 22a each comprise a contact surface 56a, 58a, 60a. The contact surfaces 56a, 58a, 60a are configured for contacting a portion of the tool inserted into the receiving region 14a and/or of the tool holder 16a inserted into the receiving region 14a. The contact surfaces 56a, 58a, 60a are realized in a planar manner. As an alternative to this, the contact surfaces 56a, 58a, 60a can be realized in a curved manner at least in part and/or in a structured manner (cf. also FIG. 10). The contact element 18a, 20a, 22a is flexibly deformable at least in part. The contact surface 56a, 58a, 60a is flexibly deformable at least in part.

The contact elements 18a, 20a, 22a are arranged in part inside the receiving region 14a. The contact elements 18a, 20a, 22a project into the receiving region 14a. The contact element 18a, 20a, 22a extends, with the tool insert and/or tool holder insert 74a in a receive-ready state, into the interior 46a of the receiving region 14a. The portion of the contact element 18a, 20a, 22a which extends into the interior 46a of the receiving region 14a, comprises a transverse extension 88a. The transverse extension 88a of the contact element 20a shown in FIG. 3, which extends into the interior 46a of the receiving region 14a, corresponds to approximately 5% of a transverse extension 90a of the receiving opening 66a. An entire transverse extension 84a of the mounted contact element 20a in a horizontal direction is approximately 30% of the transverse extension 90a of the receiving opening 66a. The portion of the contact element 18a, 20a, 22a which extends into the interior 46a of the receiving region 14a, comprises a partially wedge-shaped outer shape 48a. The partially wedge-shaped outer shape 48a is realized as a truncated wedge shape. The contact element 18a, 20a, 22a, with the tool insert and/or tool holder insert 74a in a receive-ready state, extends in a wedge-shaped manner in the direction of the interior 46a of the receiving region 14a. The contact element 18a, 20a, 22a comprises two side faces 50a, 52a. The wedge-shaped outer shape 48a of the contact elements 18a, 20a, 22a spans a wedge angle 54a between the two side faces 50a, 52a of the contact element 18a, 20a, 22a. The wedge angle 54a is 25°.

The contact element 18a, 20a, 22a is realized separately from the base body 10a. The contact element 18a, 20a, 22a is realized so as to be exchangeable. The base body 10a comprises a holder element 114a for receiving a contact element 18a, 20a, 22a. The holder element 114a is realized as a rail. When a contact element 18a, 20a, 22a is inserted and/or replaced, the contact element 18a, 20a, 22a is inserted into the holder element 114a. The holder element 114a preferably comprises a latching mechanism for latching the contact element 18a, 20a, 22a in a latching position once it has been inserted into the holder element 114a. Such a latching mechanism can be realized, for example, by a positive locking closure of flexible plastic material parts in one another.

FIG. 4 shows a lateral sectional view of a tool insert and/or tool holder insert 74a along a section plane A indicated in FIG. 3. The contact surfaces 56a, 58a, 60a comprise a tangential plane 108a in a partial region of the contact element 18a, 20a, 22a. The tangential plane 108a comprises a normal vector 112a. The tangential plane 108a, in particular the normal vector 112a of the tangential plane 108a, comprises a partial component 110a which, with the tool insert and/or the tool holder insert 74a in a mounting position, extends parallel to the horizontal 62a. The tangential plane 108a, in particular the normal vector 112a of the tangential plane 108a, comprises a partial component 116a which, with the tool insert and/or the tool holder insert 74a in a mounting position, extends perpendicular to the horizontal 62a. The normal vector 112a of the tangential plane 108a realizes a linear combination between the perpendicular partial component 116a and the horizontal partial component 110a.

The contact element 18a, 20a, 22a comprises an outer shape. The outer shape of the contact element 18a, 20a, 22a comprises a continuously increasing contour in a direction perpendicular to the receiving direction 24a of the receiving region 14a. As an alternative to this, the outer shape could comprise a continuously decreasing contour and/or a contour which changes at least once, preferably repeatedly, between increasing continuously and decreasing continuously.

The contact surface 56a, 58a, 60a of the contact element 18a, 20a, 22a is arranged in an angled manner relative to an extrusion 64a of the receiving opening 66a. An angle 70a enclosed by the contact surface 56a, 58a, 60a and the extrusion 64a of the receiving opening 66a is 3°. The contact surface 56a, 58a, 60a of the contact element 18a, 20a, 22a is arranged in an angled manner in the receiving direction 24a relative to a prolongation 68a of the receiving region 14a. A further angle 72a enclosed by the contact surface 56a, 58a, 60a and the prolongation 68a of the receiving region 14a is 2°. The angle 70a enclosed by the contact surface 56a, 58a, 60a and the extrusion 64a of the receiving opening 66a and the further angle 72a enclosed by the contact surface 56a, 58a, 60a and the prolongation 68a of the receiving region 14a are different in size. The angle 70a enclosed by the contact surface 56a, 58a, 60a and the extrusion 64a of the receiving opening 66a is greater than the further angle 72a enclosed by the contact surface 56a, 58a, 60a and the prolongation 68a of the receiving region 14a.

FIGS. 5a, 5b, and 5c show different shapes of the tool insert and/or tool holder insert 74'a, 74"a, 74'"a in top view. FIG. 5a shows a tool insert and/or tool holder insert 74'a which realizes a shovel shape 34a. FIG. 5b shows a tool insert and/or tool holder insert 74"a, which realizes a spatula shape 36a. FIG. 5c shows a tool insert and/or tool holder insert 74'"a, which realizes a shape of a letter Y 38a that is closed at the top.

FIG. 6 shows a system 76a of tool inserts and/or tool holder inserts 74a, 78a having at least two tool inserts and/or tool holder inserts 74a, 78a. The tool inserts and/or tool holder inserts 74a, 78a are arranged with respect to one another such that side walls 26a, 28a of the two tool inserts and/or tool holder inserts 74a, 78a partly engage. The first tool insert and/or tool holder insert 74a is rotated by 180° in the horizontal plane and is arranged adjoining the second tool insert and/or tool holder insert 78a. Further systems of tool inserts and/or tool holder inserts can be arranged on both sides of the system 76a. As a result of arranging a plurality of tool inserts and/or tool holder inserts 74a, 78a in systems 76a, an arrangement is formed in which tools and/or tool holders 16a are storable in two rows 98a, 100a which are offset laterally to one another. As a result, a particularly large number of tools and/or tool holders 16a can be accommodated in an advantageous manner in a small space along a direction parallel to the rows 98a, 100a.

FIG. 7 shows a tool storage system and/or tool holder storage system 96a with tool inserts and/or tool holder inserts 74a, 78a. The tool storage system and/or tool holder storage system 96a comprises a tool storage unit 92a. The tool storage unit 92a is realized as a mobile cart. The tool storage unit 92a comprises mounting rails 94a. The mounting rails 94a are configured for mounting tool inserts and/or tool holder inserts 74a, 78a. The mounting rail 94a is configured for fastening the tool inserts and/or tool holder inserts 74a, 78a by means of the mounting element thereof 44a. The tool storage unit 92a realizes an external structural unit. Systems 76a of tool inserts and/or tool holder inserts 74a, 78a are mountable in a mounting rail 94a of the tool storage unit 92a. The tool inserts and/or tool holder inserts 74a, 78a of a system 76a of tool inserts and/or tool holder inserts 74a, 78a are positioned in the mounting rail 94a such that receiving openings 66a of the receiving regions 14a of the tool inserts and/or tool holder inserts 74a, 78a are arranged in two parallel rows which are offset laterally to one another 98a, 100a.

FIG. 8 shows a tool insert system and/or tool holder insert system 80a having at least one tool insert and/or tool holder insert 74a. The tool insert system and/or tool holder insert system 80a comprises a further contact element 82a. The further contact element 82a is part of a further set of exchangeable contact elements. The further contact element 82a is realized differently to the contact element 18a, 20a, 22a. With the tool insert and/or the tool holder insert 74a in a mounting position, the further contact element 82a comprises a maximum horizontal transverse extension 86a. The maximum horizontal transverse extension 86a of the further contact element 82a is at least 50% greater than the maximum horizontal transverse extension 84a of the contact element 18a, 20a, 22a. The portion of the further contact element 82a which, with the tool insert and/or tool holder insert 74a in the mounting position and with the further contact element 82a mounted, projects into the receiving region 14a, comprises a horizontal transverse extension 88a which corresponds at least to 10% of a maximum horizontal transverse extension 90a of the receiving region 14a (cf. also FIG. 3).

FIGS. 9 to 11 show two further exemplary embodiments of the invention. The following descriptions and the drawings are limited substantially to the differences between the exemplary embodiments, with reference to identically designated components, in particular with reference to components with identical reference symbols, reference also being able to be made in principle to the drawings and/or the description of the other exemplary embodiments, in particular of FIGS. 1 to 8. To differentiate between the exemplary embodiments, the letter a is placed after the reference symbols of the exemplary embodiment in FIGS. 1 to 8. The letter a is replaced by the letters b and c in the exemplary embodiments in FIGS. 9 to 11.

FIG. 9 shows a detail of a schematic sectional view of a tool insert and/or tool holder insert 74b with an alternative contact element 18b along a section plane A (cf. FIG. 3). The contact element 18b is realized in a curved manner. The contact element 18b comprises a contact surface 56b. The contact surface 56b is realized in a curved manner. The contact element 18b is realized in a flexible manner. The contact element 18b is realized by a bending spring. The bending spring is substantially pre-biased in a spring direction 118b. The spring direction 118b extends substantially perpendicularly to a receiving direction 24b in which a tool and/or tool holder 16b is moved when storing in a receiving region 14b of the tool insert and/or tool holder insert 74b. The contact surface 56b is curved in a direction parallel to the receiving direction 24b of the receiving region 14b. A radius of curvature 120b of the curvature of the curved or arcuate contact surface 56b lies in a plane with the section plane A. When the tool and/or tool holder 16b is stored in the tool insert and/or tool holder insert 74b, the contact element 18b is deflected in the spring direction 118b.

FIG. 10 shows a cross section through the contact element 18b along a section plane B indicated in FIG. 9. The contact surface 56b is curved in a direction parallel to the receiving direction 24b of the receiving region 14b. A further radius of curvature 122b of the curvature of the curved or arcuate contact surface 56b lies in a plane with the section plane B.

FIG. 11 shows an alternative tool insert and/or tool holder insert 74c. The tool insert and/or tool holder insert 74c comprises a rectangular shape. The tool insert and/or tool-holder insert 74c comprises a receiving region 14c. The receiving region 14c is arranged in the middle of a base body 10c of the tool insert and/or tool holder insert 74c.

REFERENCE NUMERALS

10 Base body
12 Opening
14 Receiving region
16 Tool holder
18 Contact element
20 Contact element
22 Contact element
24 Receiving direction
26 Side wall
28 Side wall
30 Side face
32 Side face
34 Shovel shape
36 Spatula shape
38 Shape of the letter Y
40 Further side wall
42 Further side wall
44 Mounting element
46 Interior
48 Wedge-shaped outer shape
50 Side face
52 Side face
54 Wedge angle
56 Contact surface
58 Contact surface
60 Contact surface
62 Horizontal
64 Extrusion
66 Receiving opening
68 Prolongation
70 Angle
72 Further angle
74 Tool insert and/or tool holder insert
76 System
78 Tool insert and/or tool holder insert
80 Tool insert system and/or tool holder insert system
82 Further contact element
84 Transverse extension
86 Transverse extension
88 Transverse extension
90 Transverse extension
92 Tool storage unit
94 Mounting rail
96 Tool storage system and/or tool holder storage system
98 Row
100 Row
102 Center
104 Center
106 Axis
108 Tangential plane
110 Partial component
112 Normal vector
114 Holder element
116 Partial component
118 Spring direction
120 Radius of curvature
122 Further radius of curvature
124 Deepening
A Section plane
B Section plane

The invention claimed is:

1. A tool insert and/or tool holder insert, in particular tool storage insert and/or tool holder storage insert having at least one base body comprising at least one receiving region that is realized, in particular at least in part as an opening in the base body, for receiving at least in part at least one tool and/or at least one tool holder, wherein
the tool insert and/or tool holder insert has at least one contact element, which is arranged at least in part inside the receiving region, in particular projecting into the receiving region, for the purpose of realizing a contacting mounting of the tool and/or of the tool holder,
the base body further comprises side walls, which extend, in particular parallel to a receiving direction of the receiving region, on at least two opposite outside surfaces of the base body,
the side walls are realized to complement one another in such a way that the outer shapes of the opposite outside surfaces of the base body are formed contrary to one another,
the side walls are configured to engage with side walls of at least substantially complementarily shaped further tool inserts and/or tool holder inserts in such a way that, in the engagement, an imaginary smallest possible geometric rectangular cuboid that just still completely encompasses the tool insert and/or tool holder insert having one of said side walls, overlaps at least partly with a further imaginary smallest possible geometric rectangular cuboid that just still completely encompasses said further tool insert and/or tool holder insert,
each of the side walls comprises side faces, which realize contact faces to a further side wall of one of the further tool inserts,
the contact faces of each one of the side walls extend in at least two planes that are substantially different from one another, and
a center of a receiving opening of the receiving region is arranged laterally offset in the base body.

2. The tool insert and/or tool holder insert according to claim 1, wherein at least two of the planes defined by the side faces, in particular contact faces, of a side wall of the side walls, which are realized to complement one another, extend at least substantially parallel to one another.

3. The tool insert and/or tool holder insert according to claim 1, wherein in a top view the base body realizes at least substantially a shovel shape, a spatula shape and/or a shape of a letter Y which is closed at the top.

4. The tool insert and/or tool holder insert according to claim 1, wherein the contact element has an outer shape which comprises an at least substantially continuously increasing and/or continuously decreasing contour at least in a direction that is perpendicular to a receiving direction of the receiving region.

5. The tool insert and/or tool holder insert according to claim 1, wherein, in a receive-ready state, the contact element extends into an interior of the receiving region with the tool insert and/or the tool holder insert.

6. The tool insert and/or tool holder insert according to claim 1, wherein at least a portion of the at least one contact element at least partly has an at least substantially wedge-shaped outer shape.

7. The tool insert and/or tool holder insert according to claim 1, wherein the contact element, with the tool insert and/or the tool holder insert in a receive-ready state, extends in a wedge-shaped manner toward an interior of the receiving region.

8. The tool insert and/or tool holder insert according to claim 1, wherein at a contact surface of the contact element, which is configured for contacting at least a portion of a tool inserted in the receiving region and/or of a tool holder inserted in the receiving region, has in at least a partial region of the contact element at least one tangential plane comprising at least one partial component which, with the tool insert and/or the tool holder insert in a mounting position, extends parallel to the horizontal.

9. The tool insert and/or tool holder insert according to claim 1, wherein a contact surface of the contact element, which is configured for contacting at least a portion of a tool inserted in the receiving region and/or of a tool holder inserted in the receiving region, is arranged in an angled manner relative to an extrusion of a receiving opening of the receiving region, which delimits the receiving region in a receiving direction of the receiving region and/or relative to a prolongation of the receiving region in the receiving direction.

10. The tool insert and/or tool holder insert according to claim 7, wherein an angle, which is enclosed by the contact surface and the extrusion of the receiving opening and/or a further angle, which is enclosed by the contact surface and the prolongation of the receiving region differ in size.

11. The tool insert and/or tool holder insert according to claim 1, wherein the contact surface is realized at least in part in a curved manner.

12. The tool insert and/or tool holder insert according to claim 11, wherein the contact surface is curved at least substantially in a direction that is perpendicular to a receiving direction of the receiving region.

13. The tool insert and/or tool holder insert according to claim 11, wherein the contact surface is curved at least substantially in a direction that is parallel to a receiving direction of the receiving region.

14. The tool insert system and/or tool holder insert system according to claim 12, wherein at least one further contact element, with the tool insert and/or the tool holder insert in a mounting position, has a maximum horizontal transverse extension which is by at least 50% greater than the maximum horizontal transverse extension of the at least one contact element.

15. The tool insert and/or tool holder insert according to claim 1, wherein at least one contact element is at least partly flexibly deformable and/or comprises at least one contact surface which is at least partly flexibly deformable.

16. A tool insert system and/or tool holder insert system, having at least one tool insert and/or tool holder insert according to claim 1, having at least one contact element, which is realized to be exchangeable and having at least one further contact element, which is also realized to be exchangeable and which is realized differently to the contact element in such a way that the further contact element comprises an outer shape which differs from the outer shape of the contact element.

17. The tool insert system and/or tool holder insert system according to claim 16, wherein at least a portion of a further contact element, with the tool insert and/or tool holder insert in a mounting position, has a maximum horizontal transverse extension which projects into the receiving region and which is equivalent to at least 10% of a maximum horizontal transverse extension of the receiving region.

18. The tool insert and/or tool holder insert according to claim 1, wherein the two side walls of the base body, which complement one another, are configured to engage in one another in a jigsaw-piece-like manner.

19. A tool insert and/or tool holder insert according to claim 1 wherein
the contact element is realized to be exchangeable, and
the base body comprises a holder element, realized as a rail, for receiving the contact element.

20. The tool insert system and/or tool holder insert system according to claim 19, wherein the holder element comprises a latching mechanism for latching the contact element in a latching position once it has been inserted into the holder element.

21. The tool insert system and/or tool holder insert system according to claim 20, wherein the latching mechanism is realized by a positive locking closure of flexible plastic material parts in one another.

22. A system of tool inserts and/or tool holder inserts, having at least two, at least substantially complementary tool inserts and/or tool holder inserts, wherein
each of the tool inserts and/or tool holder inserts has at least one base body,
each of the tool inserts and/or tool holder inserts comprises at least one receiving region that is realized, in particular at least in part as an opening, in the base body, for receiving at least in part at least one tool and/or at least one tool holder,
each of the tool inserts and/or tool holder inserts has at least one contact element, which is arranged at least in part inside the receiving region, in particular projecting into the receiving region, for the purpose of realizing a contacting mounting of the tool and/or of the tool holder,
the base body of each of the tool inserts and/or tool holder inserts further comprises side walls, which are realized to complement one another and extend, in particular parallel to a receiving direction of the receiving region, on at least two opposite outside surfaces of the base body,
the side walls are realized to complement one another in a way such that the outer shapes of the opposite outside surfaces of the base body are formed contrary to one another,
each of the side walls comprises side faces, which realize contact faces to a further side wall of one of the further tool inserts,
the contact faces of each one of the side walls extend in at least two planes that are substantially different from one another,
a center of a receiving opening of the receiving region is arranged laterally offset in the base body,
the at least two tool inserts and/or tool holder inserts are arranged in such a manner with respect to one another such that a side wall of a first tool insert and/or tool holder insert of the at least two tool inserts and/or tool holder inserts engages with a side wall of a second tool insert and/or tool holder insert of the at least two tool inserts and/or tool holder inserts in such a way that, in the engagement, an imaginary smallest possible geometric rectangular cuboid that just still completely encompasses the tool insert and/or tool holder insert having one of the side walls overlaps at least partly with a further imaginary smallest possible geometric rectangular cuboid that just still completely encompasses the further tool insert and/or tool holder insert.

* * * * *